United States Patent
Hamaguchi et al.

(12) 
(10) Patent No.: US 6,373,659 B1
(45) Date of Patent: Apr. 16, 2002

(54) MAGNETIC SLIDER HEAD AND METHOD OF PRODUCING THE SAME

(75) Inventors: Tetsuya Hamaguchi; Keiko Watanabe; Toshihiko Shimizu; Toshihiro Arisaka, all of Ibaraki; Shinobu Yoshida, Tsuchiura, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/626,790

(22) Filed: Jul. 26, 2000

Related U.S. Application Data

(63) Continuation of application No. 09/180,045, filed as application No. PCT/JP96/02713 on Sep. 20, 1996, now Pat. No. 6,122,148.

(51) Int. Cl.[7] ................................................. G11B 5/60
(52) U.S. Cl. ..................................................... 360/234.3
(58) Field of Search .......................... 360/234.3, 235.1, 360/235.2, 235.3, 235.4, 235.6, 235.7, 235.8, 234.7, 126

(56) References Cited

U.S. PATENT DOCUMENTS

| | | | | |
|---|---|---|---|---|
| 5,270,888 A | * | 12/1993 | Collisson et al. | 360/235.1 |
| 5,473,486 A | | 12/1995 | Nepala et al. | 360/234.7 |
| 5,781,377 A | * | 7/1998 | Koba et al. | 360/235.1 |
| 5,986,851 A | | 11/1999 | Angelo et al. | 360/235.2 |

* cited by examiner

*Primary Examiner*—Allen Cao
(74) *Attorney, Agent, or Firm*—Antonelli, Terry, Stout & Kraus, LLP

(57) ABSTRACT

A magnetic head slider having a recording-reproducing element for recording and reproducing information relative to a magnetic recording medium. A sliding protective film is formed at one outer side or each of opposite outer sides of that portion, constituting the recording-reproducing element, in a direction perpendicular to a travel surface of the magnetic head slider opposed to the magnetic recording medium, at least part of the sliding protective film covers that portion reaching the travel surface, and the sliding protective film is also formed on each of side surfaces of the slider.

4 Claims, 5 Drawing Sheets

MAGNETIC SLIDER HEAD AND METHOD OF PRODUCING THE SAME

CROSS REFERENCE TO RELATED APPLICATION

This is a continuation of U.S. application Ser. No. 09/180,045, filed Nov. 19, 1998, now U.S. Pat No. 6,122,148 which is a 371 of PCT/JP96/02713 filed Sep. 20, 1996 the subject matter of which is incorporated by reference herein.

TECHNICAL FIELD

This invention relates to a magnetic recording unit used as an external recording unit for a computer or the like, and more particularly to a magnetic head slider which is suitable for enhancing the sliding durability of a recording-reproducing element portion and a slider, having this element portion mounted thereon, and also is suitable for enhancing the recording density.

BACKGROUND ART

As disclosed in Japanese Patent Unexamined Publication No. 2-103714, in a conventional magnetic head slider, a recording-reproducing element portion has an alumina film which is formed as a base film for forming and holding magnetic poles, a coil, a magneto-resistance effect element and so on, or as a protective film which is effective in an element-forming process so that the magnetic poles, the coil, the magneto-resistance effect element and so on will not be damaged during process steps and during handling. As described in the above publication, this alumina film can be relatively easily worn and damaged upon sliding contact with a medium. Therefore, in the above conventional example, the area of exposure of this alumina film to the sliding surface is kept to a minimum so as to reduce the probability of sliding contact of this alumina film with the medium. Therefore, this alumina film does not function as a sliding protective film for sliding contact with the medium, but functions as the base film, which is part of the element-forming members, or as the protective film effective in the element-forming process.

Recently, the frequency of contact between a slider and a medium increases with a reduced flying height of the slider and also with the practical use of a contact-recording system in which a slider is always held in contact with the medium, and besides with the practical use of magneto-resistance effect elements having poor sliding durability, the enhancement of the sliding durability can not be expected even if the area of the process protective film is reduced as in the above conventional example, and there has been encountered a problem that the element portion travel surface is worn and damaged.

Therefore, a sliding protective film, constituted by a multi-layer film made of silicon, carbon and so on, has been formed on a slider travel surface, a flying rail surface and an element portion travel surface (hereinafter, the-surfaces in this direction will be referred to as "travel surface") so as to protect these surfaces from sliding contact.

In order to achieve a high-density recording design of a magnetic disk unit, it is necessary to make the distance (this distance will hereinafter be referred to as "magnetic spacing") between the element portion travel surface and a magnetic layer of the medium very narrow. This sliding protective film is a loss for the narrowing of the magnetic spacing, and therefore the thickness of this sliding protective film has heretofore been not more than several tens of nm.

However, as described above, the frequency of contact between the slider and the medium increases, and there has been encountered a problem that the sliding protective film, having the above thickness, is insufficient in durability.

Therefore, as disclosed in Japanese Patent Unexamined Publication Nos. 7-6340, 8-45022 and 8-45045, a film with a smaller thickness, made of a material having better durability, such as diamond-like carbon (DLC), has been used as a sliding protective film, but even such a material as DLC is insufficient in durability for the contact-recording system.

Generally, a sliding protective film, made of a material such as DLC, is formed or coated by a film-forming method called sputtering or CVD. In these film-forming methods, the density and durability of the formed film are enhanced in proportion to the thickness of the formed film. Particularly, in the formation of a diamond film which is the most durable, the film must undergo crystal growth, and therefore with the currently-available techniques, the practical film, having a thickness of not more than 1 $\mu$m, can not be formed. Therefore, in order to further enhance the durability of the material, the thickness of the sliding protective film must be increased, which has invited a problem that this is contradictory to the narrowing of the magnetic spacing.

Further, in the formation of the diamond film, the temperature of the film, as well as the temperature of its vicinity, becomes more than 800° C. In the conventional method in which the sliding protective film is formed after the recording-reproducing element is formed, the recording-reproducing element is destroyed by this temperature, and therefore diamond could not be used as the sliding protective film.

Japanese Patent Unexamined Publication Nos. 8-45022 and 8-45045 disclose a technique in which the sliding protective film is formed not only on the travel surface but also on a surface perpendicular to this travel surface so as to prevent corrosion and also to protect an edge portion of the slider. However, it is very difficult to form the film on the two surfaces continuous with each other in perpendicular relation to each other, and besides since the sliding protective film is present even at the element portion travel surface, there has been encountered a problem that this technique is not suitable for further narrowing the magnetic space.

In a method of producing the conventional magnetic head slider, the recording-reproducing elements are formed on a surface of a slider substrate by an ordinary film-forming method, and thereafter the substrate is cut into slider blocks by machining, and the sliding protective film is formed on the cut surface, again using the film-forming method. Therefore, this method has an increased number of process steps, and is complicated.

The above conventional technique has a problem that no consideration is given for satisfying the requirement for the narrowed magnetic spacing and the requirement for the enhanced sliding durability of the travel surface in a compatible manner while enhancing the performance to a higher level, and therefore the enhancement of the recording density for the future and the assurance of the reliability for an increase of the contact frequency resulting therefrom can not be achieved in a compatible manner.

DISCLOSURE OF THE INVENTION

It is an object of this invention to provide a magnetic head slider which achieves a narrowed magnetic spacing and the enhanced sliding durability of a travel surface in a compatible manner, and can be manufactured easily, and is inexpensive.

The above object is achieved by a construction in which instead of providing a sliding protective film, which covers a recording-reproducing element portion, on a travel surface of a magnetic head slider opposed to a medium, a sliding protective film is formed on any of surfaces perpendicular to the travel surface, and at least part of this sliding protective film covers that portion reaching the travel surface.

By providing this sliding protective film between a body of the magnetic head slider and a recording-reproducing element or at an inflow-side end surface of the magnetic head slider, a choice of a material for the sliding protective film is widened, and also in the latter case, an edge at the inflow end can be protected.

It is more preferred that the thickness of this sliding protective film in a direction of formation of this film be not less than 100 nm, and if at least one layer of this sliding protective film is made of diamond or diamond-like carbon, the sliding durability is further enhanced.

When forming the recording-reproducing element on a surface of a substrate defining a material of the magnetic head slider, the sliding protective film is formed in the same direction as a direction of formation of a film defining the recording-reproducing element, and by doing so, there can be provided the magnetic head slider which-can be easily-manufactured, and is inexpensive.

If the magnetic head slider of the present invention is used, the magnetic spacing can be reduced since any sliding protective film is not provided on a element portion travel surface, so that the high-density magnetic recording can be achieved.

The sliding protective film is formed in the direction perpendicular to the travel surface, and reaches the travel surface, and when the slider contacts the medium, that end surface of the sliding protective film, disposed at the travel surface, is in sliding contact therewith. This sliding protective film is hard, and has good sliding durability, and therefore reduces a contact stress on other travel surface portion than this end surface, thereby reducing damage due to wear.

Namely, the narrowing of the magnetic spacing and the enhancement of the sliding durability of the travel surface can both be achieved in a compatible manner.

By providing the sliding protective film of the present invention between the body of the magnetic head slider and the recording-reproducing element or at the inflow-side end surface of the magnetic head slider, the sliding protective film can be formed before the recording-reproducing element is formed, and therefore diamond, which requires a high temperature in a production process, can be used. When the magnetic head slider slides over the medium in contact therewith, a contact stress, acting on the edge portion of the magnetic head slider at the inflow end thereof, increases because of this frictional force, so that this portion is particularly worn. The sliding protective film of the present invention can be formed into a large thickness, and when this film is provided at the inflow-side end surface of the magnetic head slider, the edge portion at the inflow end is substantially protected, and there is no need to provide any sliding protective film on the travel surface as in the conventional construction.

Usually, the sliding protective film is formed by a film-forming technique such as sputtering and CVD. A film, formed by such a technique, has such a nature that its density and durability are enhanced in proportion to its thickness. Particularly when the thickness of the film is not less than 100 nm, its properties are markedly enhanced. The sliding protective film of the present invention exists in the direction perpendicular to the travel surface, and the film thickness does not cause a loss of the magnetic spacing, and therefore the thickness of the sliding protective film can be increased. Therefore, the sliding protective film with a thickness of not less than 100 nm, which has the better sliding durability than before, can be used. Furthermore, if the sliding protective film is made of a material, which is hard, and has good durability, such as diamond-like carbon and diamond, the above effects can be more positively achieved.

Therefore, the film of diamond-like carbon or diamond, having a thickness of not less than 1 $\mu$m, which has heretofore been unable to be used, can be used.

And besides, in the magnetic head slider of the present invention, when forming the recording-reproducing element on the surface of the substrate defining the material of the magnetic head slider, the sliding protective film can be formed in the same direction as the direction of formation of the film defining the recording-reproducing element, and therefore there can be provided the magnetic head slider which greatly reduces the steps of the production process, and can be easily manufactured, and is inexpensive.

BEST MODE FOR CARRYING OUT THE INVENTION

A magnetic head slider for a magnetic disk unit according to one embodiment of the present invention will now be described with reference to the drawings.

Figure 1:
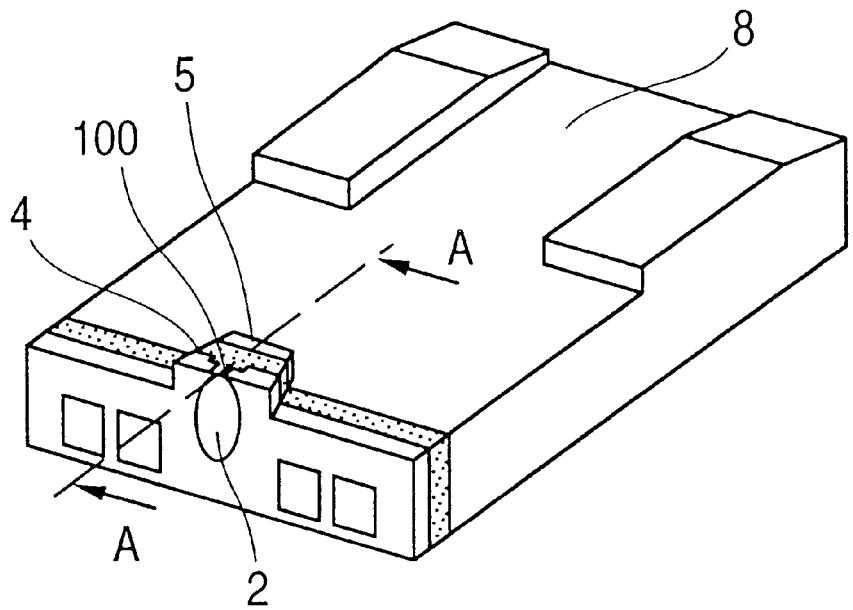
FIG. 1 is a perspective view of a magnetic head slider of the present invention.
Figure 2:
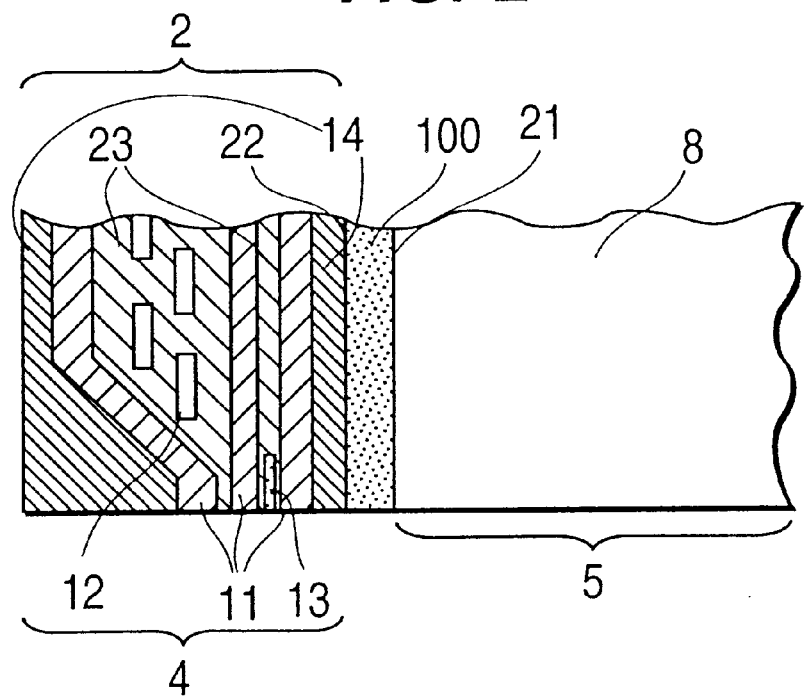
FIG. 2 is an enlarged cross-sectional view taken along the line A—A of FIG. 1.

FIG. 1 is a perspective view of one embodiment of the magnetic head slider of the present invention, and an enlarged cross-sectional view, taken along the line A—A, is shown in FIG. 2. This embodiment is directed to an example in which a sliding protective film 100 is provided between a magnetic head slider body 8 (made of $Al_2O_3$—TiC) and a recording-reproducing element 2. The sliding protective film 100 is a film of diamond with a thickness of 10 $\mu$m formed by a CVD film-forming method. In order to enhance the adhesion between the sliding protective film 100 and the slider body 8 and the adhesion between the sliding protective film 100 and a process protective film 14 (made of Al$_2$O$_3$), a film of SiO$_2$ with a thickness of about 20 nm is formed at each of their interfaces 21 and 22. It is generally well known to use such an intermediate film in order to enhance the adhesion. There are various kinds of materials for this intermediate film, which include SiC, SiN and Si other than SiO$_2$, and the intermediate film, used in the present invention, may be made of any of these materials or any other suitable material. Magnetic poles 11, made of permalloy, are formed on an outer side of the process protective film 14, and a magneto-resistance effect element 13 is formed in an insulating film 23 formed between the magnetic poles 11, and a coil 12 is formed in an insulating film 23 formed between the magnetic poles 11, and a process protective film 14, made of alumina, is formed at an outermost surface. In this embodiment, the sliding protective film 100 is formed before the recording-reproducing element 2 is formed, and therefore there is no portion which is adversely affected even when the ambient temperature becomes high in the diamond film-forming process. In this embodiment, particularly, there is achieved a marked effect of protecting an element portion travel surface 4 and a slider travel surface 5, which are disposed in the vicinity of the sliding protective film 100, from damage due to wear by this sliding protective film.

Figure 3:
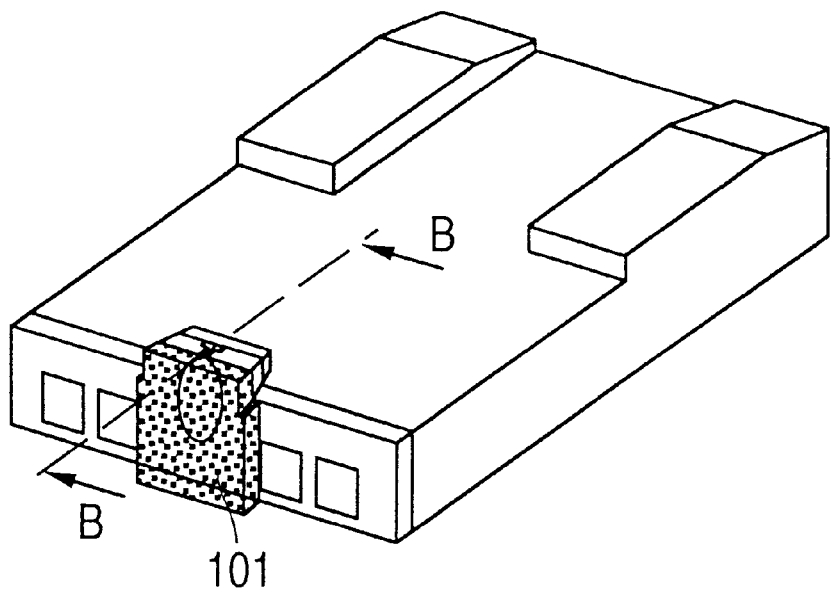
FIG. 3 is a perspective view of a magnetic head slider of the present invention.
Figure 4:
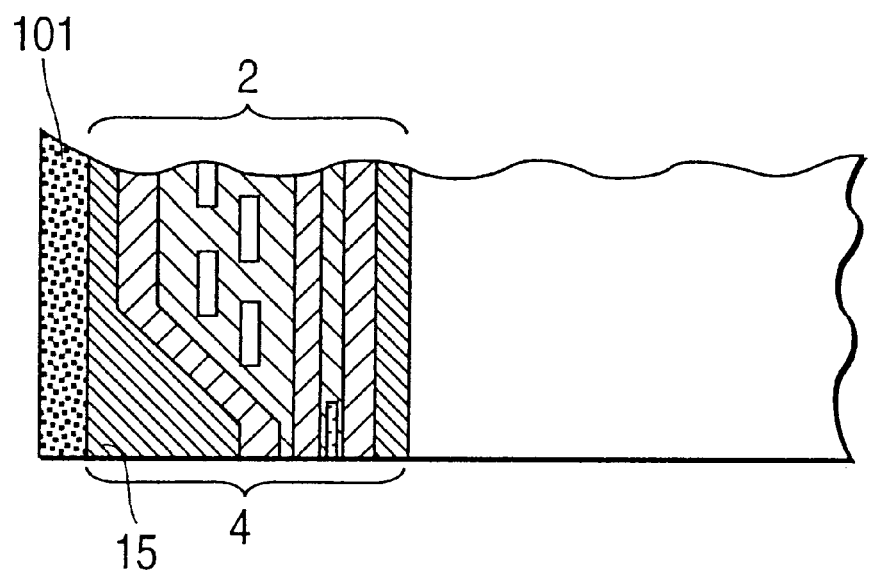
FIG. 4 is an enlarged cross-sectional view taken along the line B—B of FIG. 3.

FIG. 3 is a perspective view of another embodiment of a magnetic head slider of the present invention, and an enlarged cross-sectional view, taken along the line B—B, is shown in FIG. 4. This-embodiment differs from the preceding embodiment in that instead of providing the sliding protective film between the slider body 8 and the process protective film 14, a sliding protective film 101 of diamond-like carbon with a thickness of 500 nm is formed on an outer side of a process protective film 14, provided at a rear side (outflow end side) of a recording-reproducing element 2, by a CVD film-forming method. In this case, the sliding protective film 101 is formed after the recording-reproducing element 2 is formed. Since the heat-resistance temperature of the recording-reproducing element 2 is about 200° C., those materials which require a film-forming temperature of more than 200° C., can not be used. The film-forming temperature of diamond-like carbon is about 180° C., and therefore the recording-reproducing element 2 will not be destroyed, and also this material has good sliding durability, and therefore there is no problem from the viewpoint of the manufacture.

And besides, in this embodiment, particularly, the effect of protecting an outflow end-side edge 15 of an element portion travel surface 4 is marked, and if this outflow end-side edge 15 is protected, and is prevented from wear, the whole of the element portion travel surface 4 is substantially prevented from wear because of the geometrical relation with a medium upon contact therewith.

Figure 5:
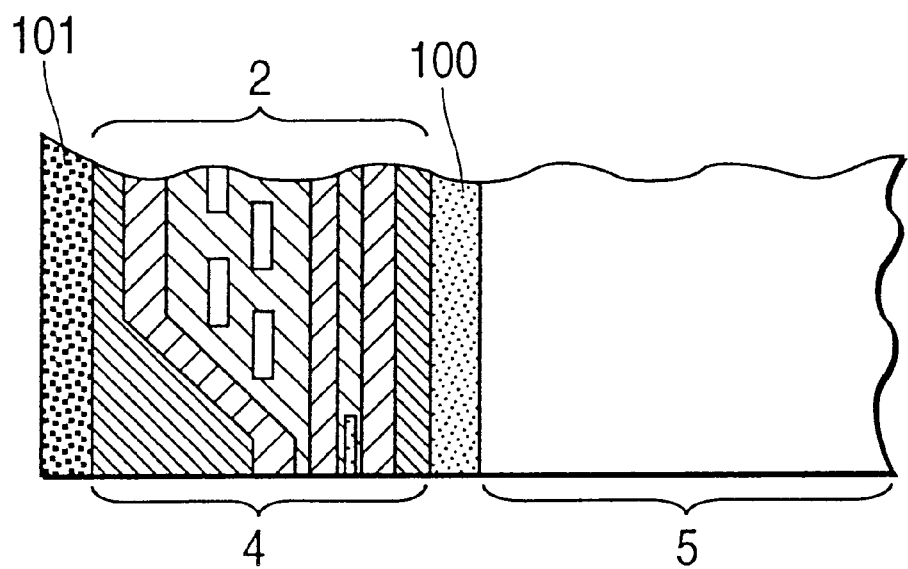
FIG. 5 is an enlarged cross-sectional view showing a recording-reproducing element portion including a sliding protective film of the present invention.

FIG. 5 shows a further embodiment of the present invention.

FIG. 5 is the embodiment provided by combining the embodiments of FIGS. 1 and 3 together. More specifically, sliding protective films 100 and 101 of the present invention are provided respectively on opposite sides of a recording-reproducing element 2, and with this construction the effect of protecting an element portion travel surface 4 and a slider travel surface 5 is further enhanced as compared with the preceding embodiments.

Figure 6:
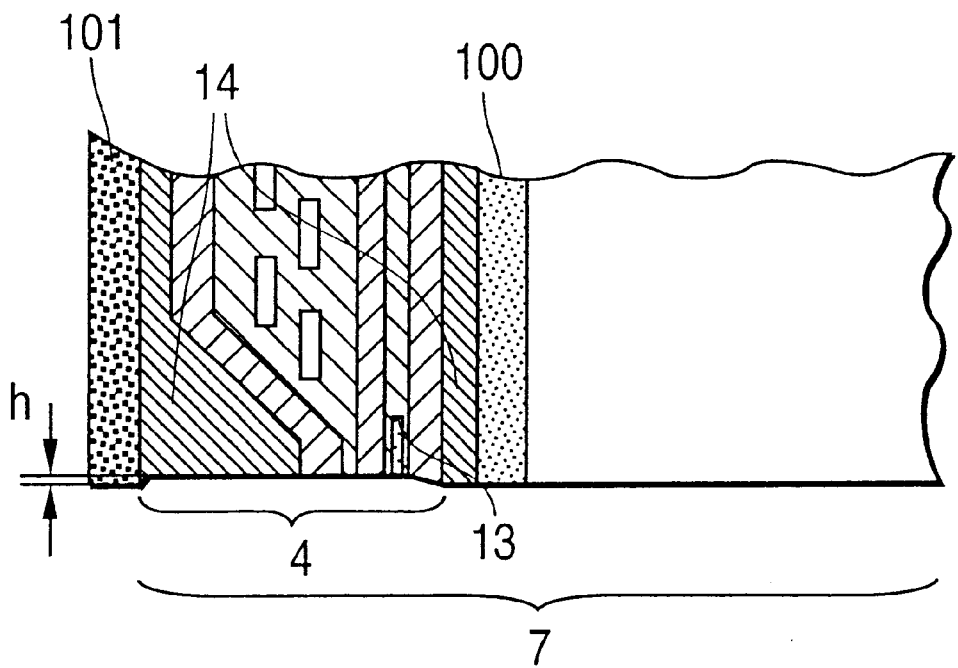
FIG. 6 is an enlarged cross-sectional view showing the recording-reproducing-element portion including the sliding protective film of the present invention.

FIG. 6 is an enlarged cross-sectional view showing the recording-reproducing element and its neighboring portions after a travel surface 7 in the embodiment of FIG. 5 is subjected to surface grinding as a final finishing step. There are occasions when a machining step as shown at h in FIG. 6 is formed depending on processing conditions of the surface grinding. This machining step is produced since the element portion travel surface 4 is more liable to wear than the sliding protective films 100 and 101 are, and a desired depth can be obtained by a combination of the materials respectively forming the sliding protective film and the element.

In this embodiment, the sliding protective film 100 is made of diamond, and the sliding protective film 101 is made of diamond-like carbon, and the element portion travel surface 4 is formed mainly by Al$_2$O$_3$ (alumina) forming process protective films 14. In this embodiment, this machining step h is not more than about 5 nm, and a loss of a magnetic spacing is not so large. When the slider is in contact with the recording medium, this machining step h forms a space, that is, an air layer. This air layer forms an insulating layer having a good electrical and thermal insulating performance, and particularly achieves the effect of preventing a discharge and an electrical conduction between a magneto-resistance effect element 13 and the recording medium. It is known that when the magneto-resistance effect element 13 is held in firm contact with the recording medium, the temperature of the magneto-resistance effect element 13 is raised by heat generated by this contact, thereby producing thermal noises. However, when the machining step h is provided as in this embodiment, this machining step h alleviates the contact between the magneto-resistance effect element 13 and the recording medium, and also thermally insulates them from each other, and therefore the effect of preventing the above heat generation so as to prevent the production of the thermal noises, is marked. This machining step h is produced not only by the surface grinding but also by the sliding contact of the magnetic head slider (whose sliding surface is smooth) with the surface of the recording medium. In either case, the sliding protective films are not worn, and therefore when the machining step h of a certain degree is produced, the element portion travel surface 4 is less liable to contact the medium, and therefore the machining step h will not become so large, and results obtained so far indicate that the machining step h did not become larger than 5 nm.

Figure 7:
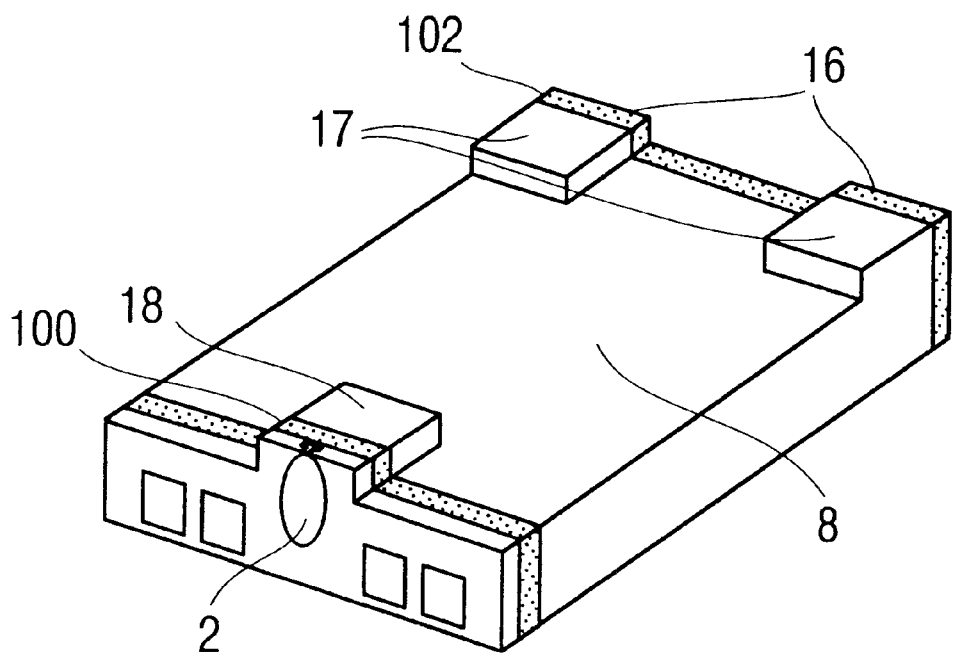
FIG. 7 is a perspective view of a magnetic head slider of the present invention.

FIG. 7 show one embodiment in which the present invention is applied to a magnetic head slider used for contact-recording. As shown in this Figure, two inflow pads 17 and an outflow pad 18, containing an element portion, travel always in contact with a recording medium. In the case of this system, particularly, edge portions of the inflow pads 17 are liable to be worn under the influence of frictional forces acting on these pads. Therefore, in this embodiment, a sliding protective film 102 is provided at inflow-side end surfaces 16 of the inflow pads 17 of the magnetic slider head, thereby protecting the edge portions of the inflow pads 17, and therefore the sliding durability for a variation of a contact load in a forward-rearward direction of the magnetic head slider 8 is particularly enhanced. And besides, the sliding protective film 102 can be formed before a recording-reproducing element 2 is formed, and therefore diamond can be used as in the embodiment of FIG. 1.

Figure 8:
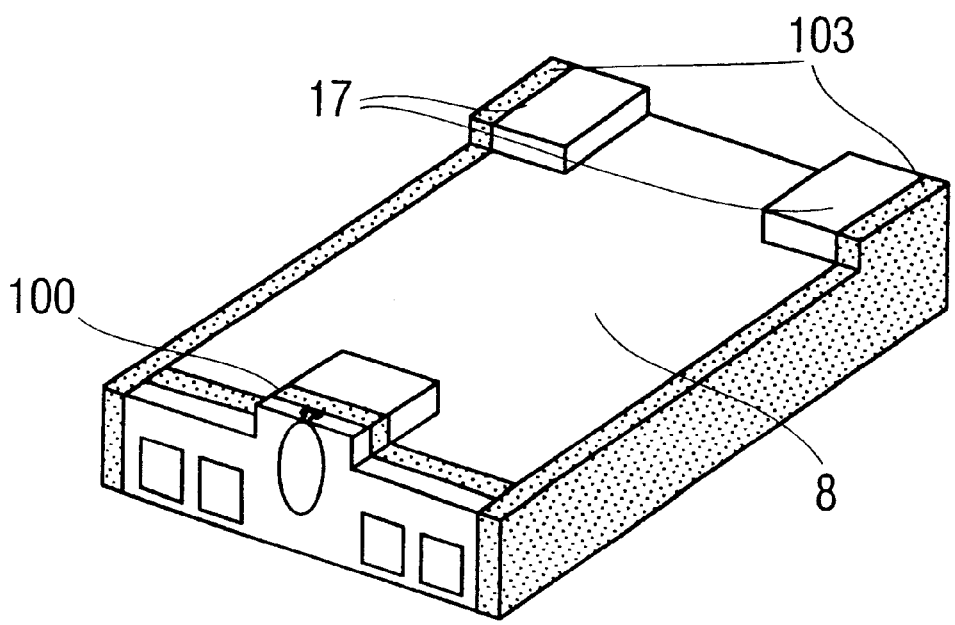
FIG. 8 is a perspective view of a magnetic head slider of the present invention.

FIG. 8 shows a further embodiment of the present invention.

FIG. 8 is directed to the embodiment in which in addition to a sliding protective film 100 shown in FIG. 1, a sliding protective film 103 is provided at each of opposite side surfaces of a magnetic head slider 8. With this construction, the effect of preventing the wear of inflow pads 17 with respect to a contact load variation in a right-left direction of the magnetic head slider is marked.

Figure 9:
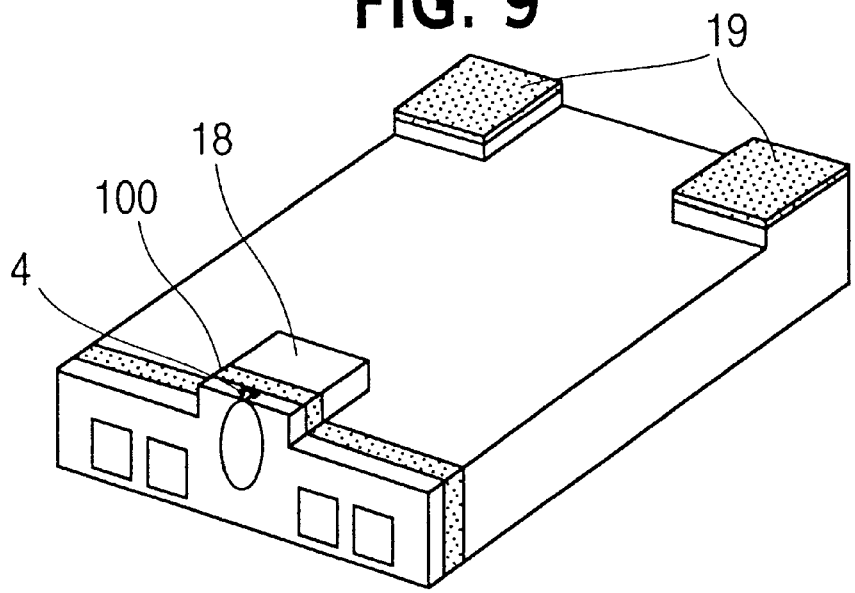
FIG. 9 is a perspective view of a magnetic head slider of the present invention.

FIG. 9 shows a further embodiment in which a sliding protective film 19 is formed on each of inflow-side pads to entirely cover a sliding surface thereof, and a sliding protective film 100 of the present invention is provided at an outflow-side pad 18 having an element portion.

The surface of the sliding protective film 19 on each of the inflow pads 17 and the surface of the outflow pad 18 are disposed substantially in the same plane. In this embodiment, a sliding protective film is not provided on an element portion travel surface 4, and by doing so, a loss of a magnetic spacing is reduced. Even if the sliding protective film 19 is formed at other travel surface than the element portion travel surface 4 as in this embodiment, the effects of the present invention are sufficiently achieved.

Figure 10:
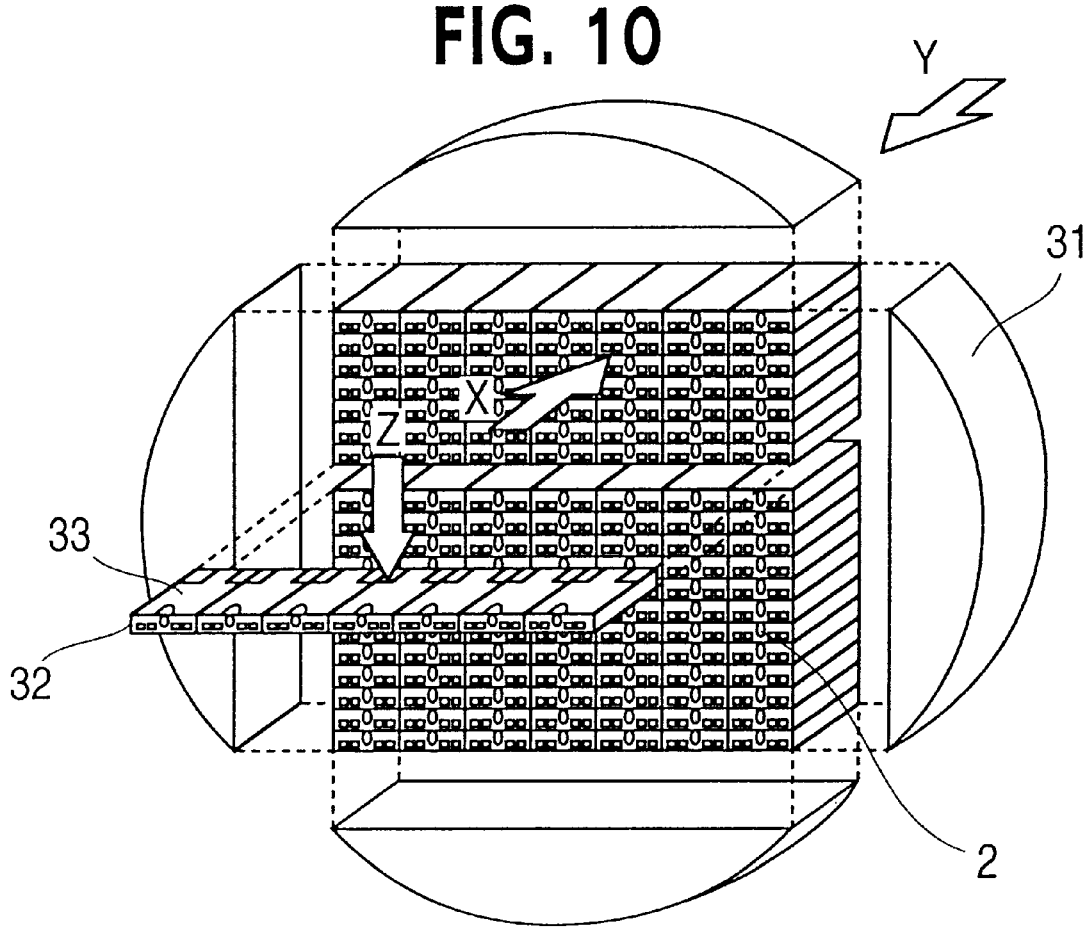
FIG. 10 is a view explanatory of a process of producing a magnetic head slider.

FIG. 10 shows a process of producing a magnetic head slider.

First, a production process according to a prior art technique will be described. Recording-reproducing elements 2 are formed on a surface of a cylindrical substrate 31 of a ceramics material from a direction X by a film-forming process such as sputtering, vapor deposition and plating. Then, a slider block 32 is taken out by machining, and then a sliding protective film is formed on a cut surface 33 from a direction Z, again-using a film-forming process. Finally, a travel surface of a predetermined configuration is formed from the direction Z by machining or the like. Thus, in the prior art technique, the sliding protective film must be formed on the cut surface 33, and therefore it has been necessary to effect the film-forming process twice. Special environments, including vacuum, high temperature and purified atmosphere, are required for the film-forming process, and besides this process is effected twice, and therefore the number of the process steps is increased, so that the cost of production of the magnetic head slider is high.

Next, the process of producing the magnetic head slider of the present invention will be described. In the case of the embodiment of FIG. 1, the sliding protective film is formed on a surface of a cylindrical substrate 31 from a direction X by a film-forming process, and then the recording-reproducing elements 2 are formed also from the direction X by a film-forming process. In the case of the embodiment of FIG. 3, the recording-reproducing elements 2 are formed, and then the sliding protective film is formed. In the case of the embodiment of FIG. 7, the sliding protective film is formed from a direction Y which is opposite to the direction X from which the recording-reproducing elements 2 are formed. Thus, in the embodiments of FIGS. 1, 3, 5 and 7 among the magnetic head sliders of the present invention, the sliding protective film can be formed from the direction X which is the same as the direction (that is, the direction X) from which the film for the recording-reproducing element 2 is formed, or from the direction Y which is opposite to the direction X. Therefore, the number of the steps of the production process, as well as the cost, can be greatly reduced.

In the present invention, the requirement for the narrowing of the magnetic spacing and the requirement for the enhanced sliding durability of the travel surface can be both satisfied in a compatible manner while enhancing the performance to a higher level, and therefore the enhancement of the recording density for the future and the assurance of the reliability for an increase of the contact frequency resulting therefrom can be achieved in a compatible manner. And besides, the cost of production of the magnetic head slider can be reduced.

INDUSTRIAL APPLICABILITY

As described above, in the magnetic head slider of the present invention, wear of the element portion upon contact with the recording medium, as well as the production of noises due to the generation of heat, is prevented, and its manufacture can be easily carried out, and therefore there can be achieved the magnetic head slider having the high performance and the high reliability, and by using this magnetic head slider in a magnetic disk-unit, it can be suitably used in the magnetic disk unit capable of-effecting the high-precision recording and reproduction.

What is claimed is:

1. A magnetic head slider having a recording-reproducing element for recording and reproducing information relative to a magnetic recording medium; characterized in that a sliding protective film is formed at one outer side or each of opposite outer sides of that portion, constituting said recording-reproducing element, in a direction perpendicular to a travel surface of said magnetic head slider opposed to said magnetic recording medium, at least part of said sliding protective film covers that portion reaching said travel surface, in which said sliding protective film is formed between a body of said magnetic head slider and the recording-reproducing element mounted on said body and said sliding protective film is also formed on each of side surfaces of said slider.

2. A magnetic head slider according to claim 1, wherein a thickness of said sliding protective film in a direction of formation of said film is at least 100 nm.

3. A magnetic head slider according to claim 1, wherein said sliding protective film formed on each side surface of said slider is disposed on a side surface of an inflow pad.

4. A magnetic head slider having a recording-reproducing element for recording and reproducing information relative to a magnetic recording medium; characterized in that a sliding protective film is formed at one outer side or each of opposite outer sides of that portion, constituting said recording-reproducing element, in a direction perpendicular to a travel surface of said magnetic head slider opposed to said magnetic recording medium, at least part of said sliding protective film covers that portion reaching said travel surface, in which at least one layer of said sliding protective film is made of diamond and said sliding protective film is also formed on each of side surfaces of said slider.

* * * * *